Figure 4:
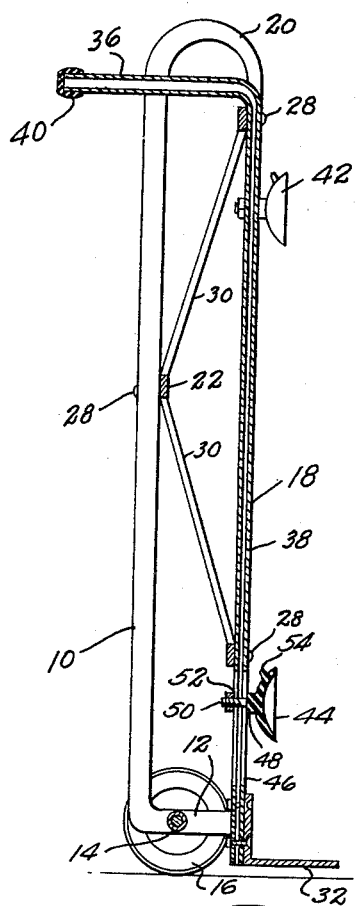

March 19, 1963     B. E. COOK     3,081,892
HAND TRUCK
Filed March 2, 1962     2 Sheets-Sheet 1
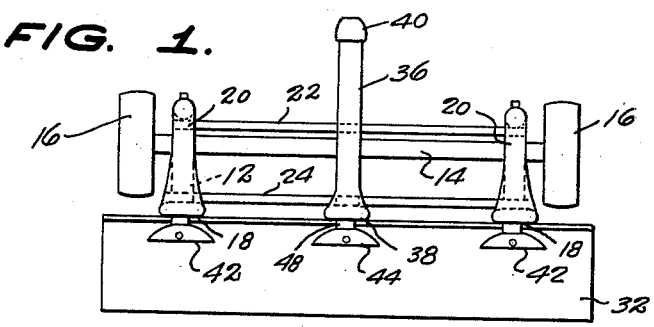
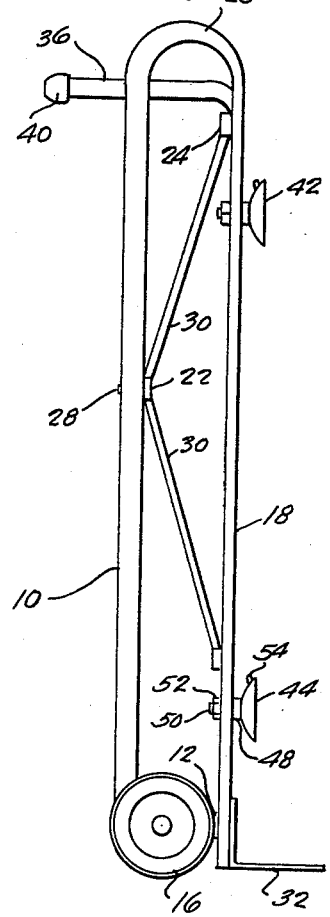
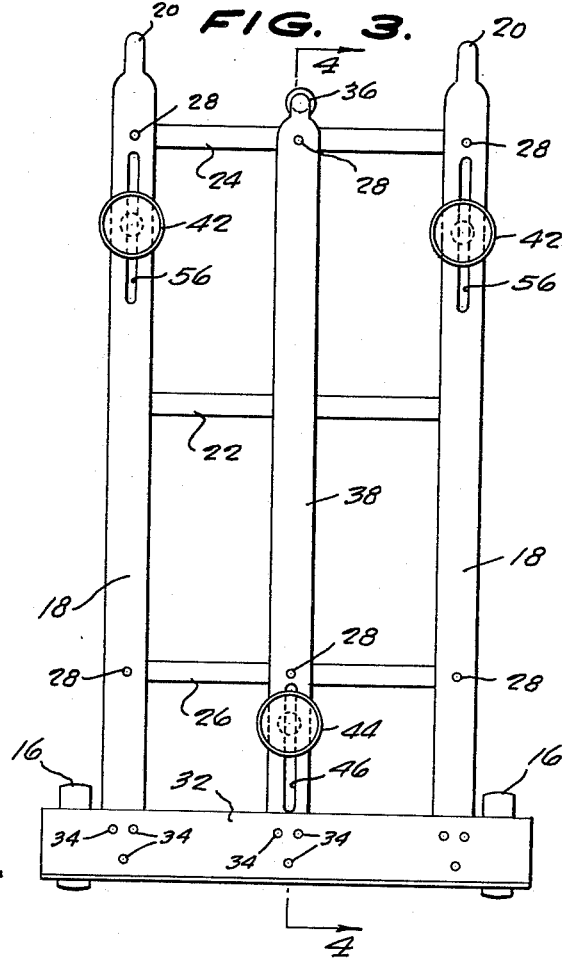
INVENTOR.
BURTON E. COOK,
BY
McMorrow, Berman & Davidson
ATTORNEYS.

March 19, 1963    B. E. COOK    3,081,892
HAND TRUCK

Filed March 2, 1962    2 Sheets-Sheet 2

INVENTOR.
BURTON E. COOK,
BY
McMorrow, Berman & Davidson
ATTORNEYS.

3,081,892
HAND TRUCK
Burton E. Cook, 2106 W. Texas St., Carlsbad, N. Mex.
Filed Mar. 2, 1962, Ser. No. 177,014
1 Claim. (Cl. 214—371)

This invention relates to a hand truck, and in particular to a two-wheeled dolly of the type designed to pick up a vertically disposed package, and wheel it about in a slightly inclined position wherein the center of gravity of the load is substantially in a vertical plane through the wheel axis. For particularly heavy loads, this mode of handling has certain shortcomings, among which is the tendency of the package to over shoot the vertical position, either due to a too rapid erection of the truck, or to an accidental erection due to a lapse of attention and control on the part of the operator. The effects in such cases are, of course, particularly acute in the case of highly elongate packages, and are a matter of special concern in cases where the contents are fragile. The question of safety of personnel is also involved.

It is therefore a general object of the invention to provide a means for securing packages to hand trucks. More particularly it is an object to provide a package-securing means for hand trucks which is simple in structure, and requires a minimum of manipulation by the truck handler. A related object is to provide a securing means of this nature, which is substantially automatic in operation. Yet another object is to provide a securing means as aforesaid, which is adjustable in position, to accommodate packages of various sizes.

These and other objects are attained by the present invention, which may be briefly described as comprising a lattice-work type hand truck or dolly, having on its load bed a series of protruding vacuum cups, mounted in elongate slots, for sliding movement of adjustment.

Figure 5:
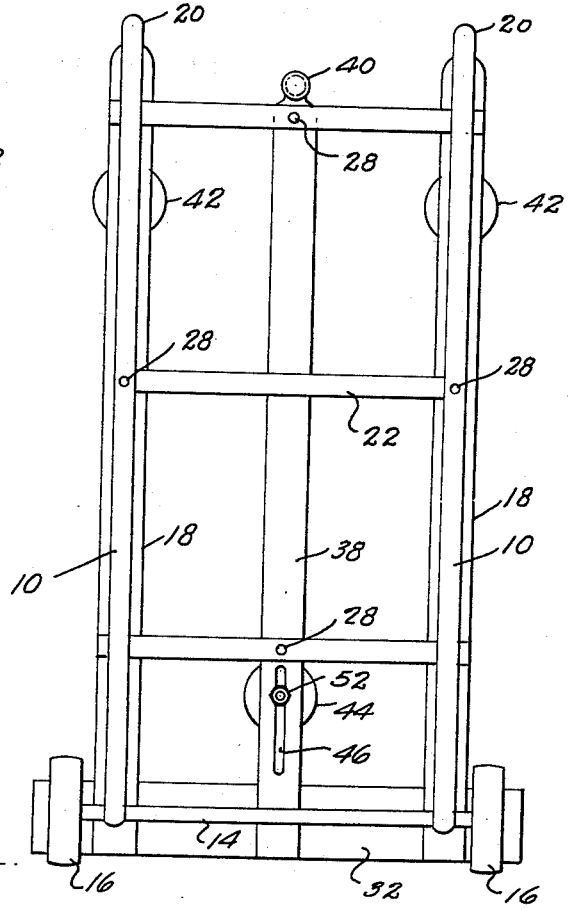
Figure 6:
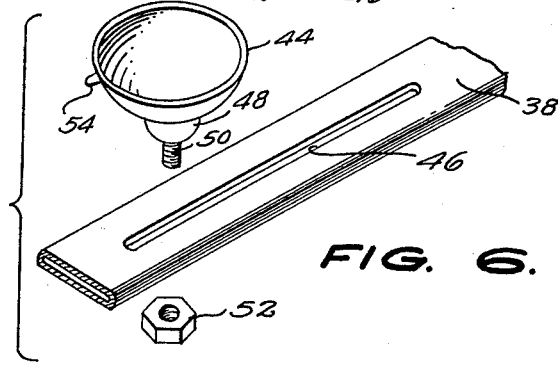

For a more detailed description of the invention, reference is made to the following description, as illustrated in the drawings, in which:

FIGURE 1 is a top plan view of the truck,
FIGURE 2 is a side elevational view of the truck of FIGURE 1,
FIGURE 3 is a front elevational view of the truck of FIGURE 2,
FIGURE 4 is a sectional view taken on the line 4—4 of FIGURE 3,
FIGURE 5 is a rear elevational view of the truck of FIGURE 2, and
FIGURE 6 is an exploded view, in perspective, and enlarged, of one of the vacuum cups, and its associated mounting member, with an elongate slot.

Referring to the drawings by characters of reference, there is shown a truck having a tubular framework comprising a pair of side frames, each having a rear, vertical tube 10, with a lower, transversely disposed leg 12, bored to receive an axle 14, which carries at its ends a pair of wheels 16. A single piece of tubing is used to form the rear section 10 of each side frame, and its front section 18, the two being connected at their upper ends by a semicircular bend 20, in the tube. In the front sections 18 of the frame, the tube is flattened, for ready attachment of other structural members of the framework, and for adjustable mounting of the vacuum cups, as will be seen. The outer ends of the lower legs 12 of the rear sections 10 are secured to the rear sides of the respective, flattened tubes 18, as by welding.

The lateral spacing members of the framework include a flat bar 22, secured at its ends to rear sections 10, near the center of their height, and the front, flattened tubes 18 are connected by a pair of similar flat bars 24, 26, near their tops and bottoms, respectively. Although shown as secured by rivets 28, these flat bars may be secured by other means, such as welding. The end frames are reinforced by a truss-work comprising a pair of diagonal struts 30, of flat stock, in each. As shown, these struts engage the sides of the cross pieces 22, 24, 26, at their ends, and are welded in place. However, other arrangements may be employed, and in particular the struts in each frame may comprise a single strip, appropriately bent, which may be riveted in place, or otherwise secured.

An angle iron 32, secured to flattened frame members 18 by rivets 34, serves as a pick-up lip and support for the load. Conventionally this lip or apron will be arranged so that the truck is generally vertical when the lip is resting on the ground, and to mount a load, the package is tilted slightly forward to enable slipping the lip underneath, and for transporting the load the package is urged against the truck bed while the truck is caused to swing backward beyond the vertical until the center of gravity of the load is substantially in the vertical plane through the truck axle.

For handling, the truck has a tubular handle 36 having a flattened portion 38, secured by rivets 28 to cross bars 24 and 26 of the truck bed, and by rivets 34 to the angle bar 32. The handle has a closure cap 40 of plastic or rubber.

In an important feature of the invention the truck bed is provided with a series of protruding vacuum cups, of rubbery material, including a pair of cups 42 near the upper ends of frame sections 18, and a cup 44 near the lower end of middle frame member 38. For mounting the latter cup, the member 38 has an elongate slot 46, and the shank 48 of the cup has a molded-in screw 50 adapted to pass through the slot 46, and to be there secured, as by a nut 52. An integral lug 54 on the cup, near its periphery is adapted to be grasped by the fingers, and enables relief of the suction by a small applied force.

The cups 42 are similar in all respects to cup 44, and are similarly mounted for adjustment along slots 56 in the members 18.

It will be seen that in the act of inserting the tongue or apron 32 under the package to be handled, and subsequent dwell of the package on the apron, the suction cups will make pressurized contact with the package, so as to grip it, and this grip may be increased by a slight forward pressure on the truck. Thus gripped, the package will follow the truck when it is swung rearwardly to position the center of gravity over or beyond the axle. The package is also secure against accidental dislodgment in subsequent handling, including the act of returning the package to ground-supported position. In the swinging movement involved in thus preparing the load for removal, forces of kinetic energy are engendered which increase with the total amount of the load, the height of its center of gravity, and the angular velocity of swing. One reason for the provision of two cups at the upper level of the truck is to better resist the higher kinetic energy generated at the higher level. The adjustability along the slots enables reaching the highest point in any of a variety of sizes of package, and also enables handling of packages of various shapes.

While a certain preferred embodiment has been shown and described, various modifications will be apparent, in the light of this disclosure, and the invention should not, therefore, be deemed as limited, except insofar as shall appear from the spirit and scope of the appended claim.

I claim:

A hand truck adapted for the handling of bulky items and for removal thereof from closely spaced side-by-side locations, the hand truck comprising:

(a) an open, elongated frame;
(b) ground wheels on the frame;

(c) said frame including vertically disposed side members and a vertically disposed handle member interposed between the side members;
(d) said frame including upper and lower ends;
(e) load handling means secured to the frame at its lower end and extending outwardly therefrom;
(f) said side members having vertically elongated slots therein adjacent the upper ends of the frame;
(g) said handle member having a vertically elongated slot therein adjacent the lower end of the frame; and
(h) vacuum cups secured in each slot for vertically adjustable positioning, whereby to provide a pair of cups adjacent the upper end of the frame and a cup adjacent the lower end of the frame, operated in response to load pressure.

References Cited in the file of this patent

UNITED STATES PATENTS

| | | |
|---|---|---|
| 2,447,300 | Williams | Apr. 17, 1948 |
| 2,484,531 | Simmons | Oct. 11, 1949 |
| 2,541,819 | Hudson | Feb. 13, 1951 |
| 2,721,086 | Gorley et al. | Oct. 18, 1955 |
| 2,738,086 | Reich | Mar. 13, 1956 |
| 2,838,190 | Stevens | June 10, 1958 |
| 2,903,147 | Davis | Sept. 8, 1959 |
| 2,942,745 | Horton | June 28, 1960 |
| 3,010,588 | McBean et al. | Nov. 28, 1961 |
| 3,051,331 | Schramm | Aug. 28, 1962 |